United States Patent [19]
Kaku

[11] Patent Number: 5,987,334
[45] Date of Patent: Nov. 16, 1999

[54] MULTI-MODAL HANDY PHONE

[75] Inventor: Tomoya Kaku, Tokyo, Japan

[73] Assignee: NEC Corporation, Japan

[21] Appl. No.: 08/804,813

[22] Filed: Feb. 24, 1997

[30] Foreign Application Priority Data

Feb. 27, 1996 [JP] Japan .................................. 8-039578

[51] Int. Cl.⁶ .............................. H04Q 7/32; H04Q 7/38; H04Q 7/34
[52] U.S. Cl. .......................... 455/552; 455/552; 455/425; 455/421
[58] Field of Search ................... 455/552, 553, 455/426, 421, 462, 74

[56] References Cited

U.S. PATENT DOCUMENTS

| | | | |
|---|---|---|---|
| 4,996,715 | 2/1991 | Marui et al. | 455/421 |
| 5,212,684 | 5/1993 | MacNamee et al. | 370/280 |
| 5,260,988 | 11/1993 | Schellinger | 455/552 |
| 5,367,558 | 11/1994 | Gillig et al. | |
| 5,390,365 | 2/1995 | Enoki et al. | 455/553 |
| 5,406,615 | 4/1995 | Miller, II et al. | 455/552 |
| 5,544,224 | 8/1996 | Jonsson et al. | 455/434 |
| 5,550,895 | 8/1996 | Burson et al. | 455/552 |
| 5,594,782 | 1/1997 | Zicker et al. | 455/417 |
| 5,703,934 | 12/1997 | Zicker et al. | 379/142 |
| 5,732,347 | 3/1998 | Bartle et al. | 455/421 |

FOREIGN PATENT DOCUMENTS

| | | |
|---|---|---|
| 61-274552 | 12/1986 | Japan . |
| 5-316025 | 11/1993 | Japan . |
| 6-152745 | 5/1994 | Japan . |
| 6-296155 | 10/1994 | Japan . |
| 7-298339 | 11/1995 | Japan . |
| WO 9526094 | 9/1995 | WIPO . |

*Primary Examiner*—Dwayne D. Bost
*Assistant Examiner*—Alan Gantt
*Attorney, Agent, or Firm*—Ostrolenk, Faber, Gerb & Soffen, LLP

[57] ABSTRACT

In order to provide a handy phone which enables a user of a radio telephone network to reopen automatically a communication disconnected because of communication quality degradation by way of another available radio telephone network with a simple configuration, a multi-modal handy phone (1) of the invention comprises a plurality of radio modules each prepared for accessing corresponding each of the plurality of radio telephone networks; monitoring means for monitoring communication quality; a change-over unit for selecting one of the plurality of radio modules according to result of the monitoring; a telephone number register for storing telephone number of the other party; a calling unit for calling the telephone number registered in the telephone number register 4 by way of one of the plurality of radio modules selected by said changeover unit; and a user interface unit.

12 Claims, 3 Drawing Sheets

MULTI-MODAL HANDY PHONE

BACKGROUND OF THE INVENTION

The present invention relates to a multi-modal handy phone provided with a plurality of radio modules for enabling the handy phone to select and communicate through a radio telephone network among those having different systems such as the PHS (Personal Handy phone System) and the PDC (Personal Digital Cellular) system, for example, optionally or dealing with degradation of communication quality.

Compared to the radio telephone network called the PDC which has a wide service area in Japan covering most of the principal cities, the service area of the PHS as of 1995 is yet smaller, only covering busy streets and shopping areas around railway stations in metropolises such as Tokyo. With respect to the covering area of a relay station, that of the PHS is limited to several hundreds' meters in radius, while that of the PDC attains several kilometers. However, there are many underground facilities such as a sub-mall or a sub-street where the PHS is available even when the PDC system is not accessible. The low cost service charge is also an advantage of the PHS system superior to that of the PDC system.

This is the reason why the multi-modal handy phone is expected. With a multi-modal handy phone having radio modules accessible to different radio telephone networks, a user may select another network that remains available even when the network in use goes out of service because the user has gone out from its service area, for instance.

As a prior art similar to the multi-modal handy phone, there is a Japanese patent application laid open as a Provisional Publication No. 274552/'86, wherein is disclosed a communication apparatus which can automatically call the other party through another network when a communication network is found unavailable, effectively increasing connection probability with the other party.

However, any countermeasure against disconnection during a communication because of going out of the service area, for instance, is not considered in the prior art being proposed to be applied for wire-networks.

In another Japanese patent application laid open as a Provisional Publication No. 152745/'94, a prior art concerning a portable telephone system is disclosed, wherein an exchange station for a private radio telephone network in a precinct is provided with a relaying apparatus of a public radio telephone network to the private radio network having different carrier frequency than the public network. The relaying apparatus receives data from the public network for transmitting the data to a mobile terminal of the private network for enabling a user of a portable telephone of the public network, coming into the precinct from out of the service area of the public network, to continue receiving the data through the mobile terminal of the private network.

If the latter prior art could be easily applied between different public radio telephone systems such as the PHS and the PDC system, a user of a PHS handy phone, for example, might be able to receive a call from the PDC system with his ordinary PHS handy phone through a relay station of the PHS provided with a relaying apparatus of the PDC system. However, an enormous cost would be needed in reality together with intricate operation for providing such a relaying apparatus for every relay station of the PHS, for example.

SUMMARY OF THE INVENTION

Therefore, a primary object of the present invention is to provide a multi-modal handy phone which enables a user of a radio telephone network to reopen communication automatically even when a communication is disconnected because of going out from its service area, for example, by selecting another available radio telephone network and calling the other party through the available network, with a simple configuration.

In order to achieve the above object, a multi-modal handy phone of the present invention comprises;

a plurality of radio modules, each of the radio modules adapted to access a corresponding one of a plurality of radio telephone networks, a monitor monitoring communication quality between the multi-modal handy phone and each of the plurality of radio telephone networks, a changeover unit selecting one of the plurality of radio modules according to a result of monitoring of the monitor, a telephone number register storing telephone number of the other party with which said multi-modal handy terminal is in communication, a calling unit calling a telephone number registered in the telephone number register by way of one of the plurality of radio modules selected by the changeover unit, and a user interface unit interfacing signals to be sent and received through said one of the plurality of radio modules selected by said changeover unit with a user.

Therefore, when degradation of communication quality through a network is detected by the monitoring means, it can be reopened by calling the registered telephone number through another available network selected by the monitoring means, in the invention.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

DETAILED DESCRIPTION OF THE PREFERRED EMBODIMENTS

Now, embodiments of the present invention will be described in connection with the drawings.

Figure 1:
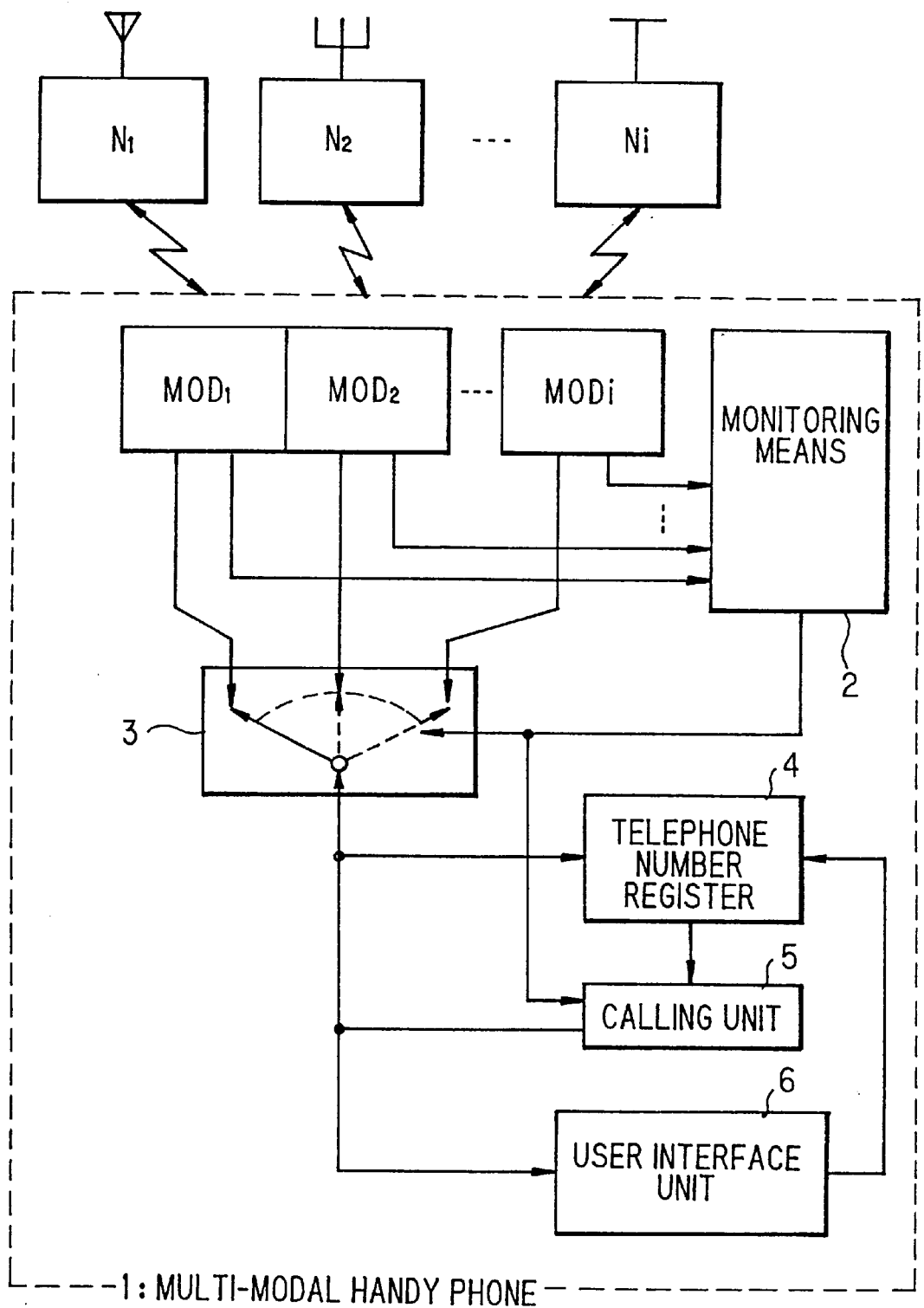
FIG. 1 is a block diagram illustrating configuration of a multi-modal handy phone 1 according to an embodiment of the invention.

FIG. 1 is a block diagram illustrating configuration of a multi-modal handy phone 1, according to an embodiment of the invention, for communicating by way of one of a plurality of radio telephone networks N1 to Ni, each of which is symbolized by a rectangular block N1 to Ni (i being an integer more than one) in FIG. 1 having an antenna mark and representing a system including a relay station accessible by the multi-modal handy phone 1, a base station thereof, and communication lines from the relay station to a telephone terminal of the other party to be called by the multi-modal handy phone.

The multi-modal handy phone 1 comprises;

a plurality of radio modules MOD1 to MODi, each of which is prepared to communicate with a corresponding one of the plurality of radio telephone networks N1 to Ni, monitoring means 2 for monitoring quality of signals received from each of the plurality of radio telephone networks N1 to Ni, a changeover unit 3 for selecting one of the plurality of radio modules MOD1 to MODi according to an output of the monitoring means 2, a telephone number register 4 for storing a telephone number of the other party with which the multi-modal handy phone 1 is in communication, a calling unit 5 for calling the telephone number registered in the telephone number register 4 by way of one of the radio modules MOD1 to MODi selected by the changeover unit 3, and a user interface unit 6 including a microphone, an earphone and a keyboard.

Here, in the embodiment, each base station of the plurality of radio telephone networks N1 to Ni is provided with means for informing the telephone number of the other party in communication, which is assigned uniquely through the radio telephone networks N1 to Ni and other wired telephone networks connected with each other, to its mobile terminals connecting therewith.

Now, the receiving and calling operation of the embodiment will be described.

First, the receiving operation is described according to a case when the multi-modal handy phone 1 is called from the other party through a network Na among the plurality of the radio telephone networks N1 to Ni.

In this case, a communication is performed making use of a radio module MODa corresponding to the network Na. At the beginning of the communication, telephone number information (telephone number itself, for instance) of the calling party is transmitted from base station of the network Na, which is registered in the telephone number register 4 of the multi-modal handy phone 1. For the telephone number register 4, a volatile memory such as a RAM (Random Access Memory) or an SRAM (Static RAM) is preferably applied for security control of the calling party.

During the communication, the monitoring means 2 monitors communication quality with the network Na, referring to error rate or amplitude of the signal received therefrom, or the carrier strength from the communicating relay station of the network Na, for instance.

For referring to the error rate, for example, the monitoring means 2 may be prepared to count, for a period, the number of symbol errors, frame errors or bit errors of the received signal for detecting degradation of the communication quality with the counted number passing over a certain threshold value. For detecting the communication quality degradation according to the signal amplitude or the carrier strength, the monitoring means may be prepared to monitor whether they are or are not under their threshold values previously defined appropriately.

In any of the above monitoring methods, fluctuation of receiving signal strength caused by multi-path fading, for example, should be considered. In case a carrier frequency of 900 MHz is received by a terminal moving at a speed of 20 Km/H, there may be a cyclic fluctuation of the amplitude of about 17 Hz, attaining to more than 10 dB, or sometimes to several tens dB depending significantly on electrical conditions such as frequency band or modulation system and geographical conditions between the terminal and the relay station.

Therefore, the monitoring means 2 of the embodiment is prepared to monitor the communication quality in a sufficiently long range for the fluctuation cycle, that is, to count number of errors for a certain period or to monitor integrated value for a certain period of the signal amplitude, for example, determined considering the fluctuation cycle of the fading.

Thus detecting a degradation of the communication quality, because of going out from the service area, for example, the monitoring means 2 informs the changeover unit 3 to connect with other radio modules {MODj} for checking communication quality with other radio telephone networks {Nj} (j being an integer from 1 to i other than a), interrupting the actual communication through the network Na. A network Nb being confirmed to have a sufficient communication quality, the changeover unit 3 is controlled to select the corresponding radio module MODb and the calling unit 5 calls the other party with the telephone number delivered from the telephone number register 4 for reopening the interrupted communication through the network Nb.

Thus, the disconnected communication through the network Na, because of going out from its service area, for example, can be resumed through another available network Nb, in the embodiment.

Calling operation of the embodiment though the network Na, by way of example, is performed similarly. When a communication with the other party is established by way of the radio module MODa through the network Na, telephone number information of the other party is registered in the telephone number register 4, with which the established communication able to be reopened in the same way as above described when it is disconnected by some communication degradation.

Figure 2:
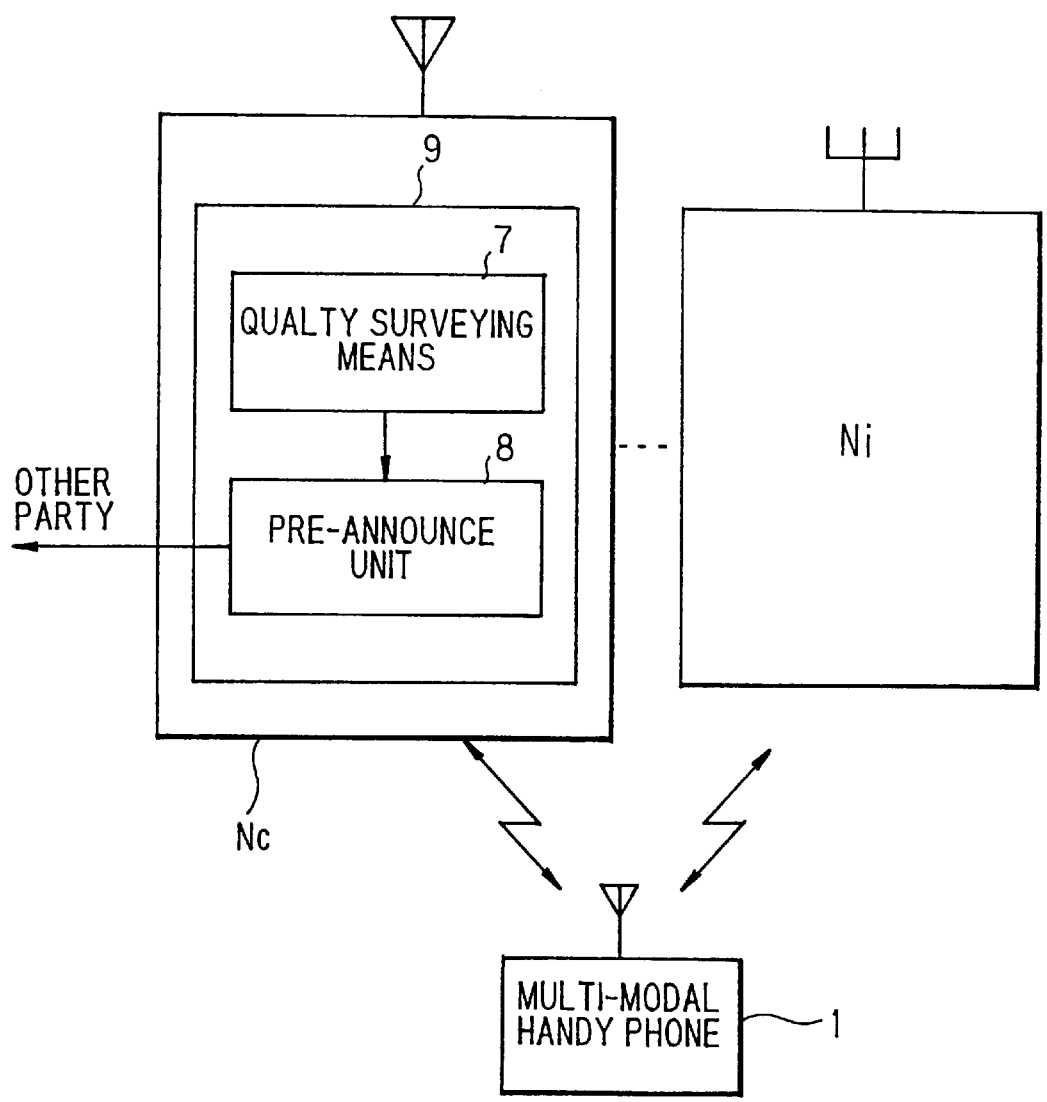
FIG. 2 is a block diagram illustrating a base station 9 according to another embodiment of the invention.

Now, another embodiment of the invention is described referring to a block diagram of FIG. 2 illustrating an example of a base station 9 according to the embodiment.

Compared to the base stations of networks N1 to Ni of FIG. 1, the base station 9 of a network Nc of FIG. 2 further comprises a quality monitor 7 for detecting abnormal interruption of each communication and a pre-announce unit 8 for pre-announcing to the other party of a communication, detected to be interrupted abnormally by the quality monitor 7, that the interrupted communication will be reopened from a multi-modal handy phone 1.

In the embodiment of FIG. 2, calling or receiving operation in the multi-modal handy phone 1, which has the same configuration as that of FIG. 1, is performed in the same way as described in connection with the embodiment of FIG. 1 and telephone number information concerning the other party to the communication is registered as well in the telephone number register 4 of the multi-modal handy phone 1.

During the communication, quality surveying means 7 of the base station 9 surveys quality of the communication for detecting an abnormal interruption thereof. When an abnormal interruption, because of going out of the multi-modal handy phone 1 from its service area, for example, is detected by the quality monitor 7, a control signal is delivered to the pre-announce unit 8 to pre-announce another call to be done from the multi-modal handy phone 1. Required from the quality monitor 7, the pre-announce unit 8 announces to the other party by way of a speech synthesizer, saying "You will be called again. Please hook your receiver and wait a moment, thank you.", for example.

Therefore, even when a communication through the network Nc is disconnected because of quality degradation, it can be reopened through another available network Na, for example, with increased probability by the preannouncement of the calling by way of another network to be done, in the embodiment, resolving anxiety of the other party at the same time.

Figure 3:
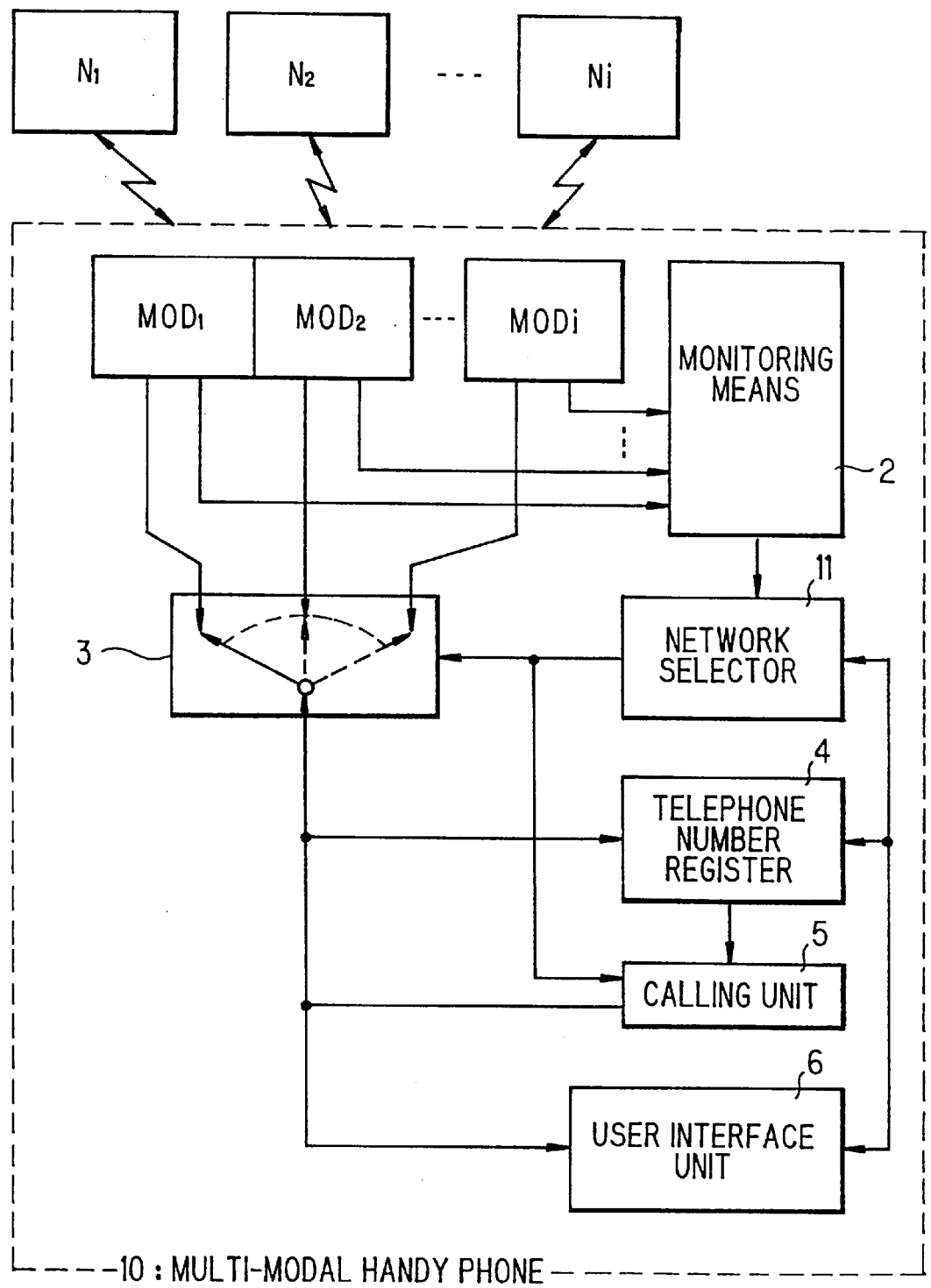
FIG. 3 is a block diagram illustrating configuration of a multi-modal handy phone 10 according to still another embodiment of the invention.

FIG. 3 is a block diagram illustrating configuration of a multi-modal handy phone 10 according to still another embodiment of the invention, wherein any of the radio telephone networks N1 to Ni may be or may not be provided with the quality surveying means 7 and the pre-announce unit 8 of FIG. 2.

In addition to the configuration of the multi-modal handy phone 1 of FIG. 1, a network selector 11 is included in the multi-modal handy phone 10 of FIG. 3. Furthermore, the user interface unit 6 of the multi-modal handy phone 10 comprises also a display, an LCD panel for example.

Before calling the other party, a user of the multi-modal handy phone 10 may indicate the monitoring means 2 to check communication quality of each radio telephone network N1 to Ni by way of the keyboard of the user interface unit 6, and select a desired one among the available networks referring to the checking result displayed on the display by the monitoring means 2.

The user may also preset priority of each of the radio telephone networks N1 to Ni in the network selector 11 by way of the keyboard according to his convenience, such as according to service charge of each of the radio telephone networks N1 to Ni, width of its service area, or robustness against movement of its mobile terminals, for instance.

Furthermore, there may be preset also a plurality of priority sets together with their identifying codes.

Now, operation of the multi-modal handy phone 10 of the embodiment is described in connection with a case where are preset a first priority set according to service charges with a first priority code '#1', a second priority set according to widths of service areas with a second priority code '#2' and a third priority set according to robustness against movement of mobile terminals with a third priority code '#3', by way of example.

When calling a telephone number, user of the multi-modal handy phone 10 first enters the second priority code '#2', for example, followed by the telephone number. Then, the network selector 11 of the multi-mode handy phone 10 indicates the changeover unit 3 to select all of the radio modules MOD1 to MODi sequentially for obtaining available networks {Nk} (k being a certain integer not more than i) checked by the monitoring means 2, among which the network selector 11 selects a network Nd, the PDC system for example, having a highest priority in the second priority set, and so the calling unit 5 calls the telephone number through the corresponding radio module MODd selected by the network selector 11, the telephone number information being registered in the telephone number register 4.

When the monitoring means 2 detects degradation of the communication quality through the network Nd because of the multi-modal handy phone 10 entering into a sub-mall out of its service area, for example, the monitoring means 2 informs the network selector 11 to select another network. Then, the network selector 11 selects a network Ne among available networks {Nl} (l being a certain integer not more than i) newly checked, the PHS for example, having a highest priority in the priority set indicated by the user, '#2' in the example, in the same way as above described, and the calling unit 5 calls the telephone number registered in the telephone number register 4 by way of the corresponding radio module MODe.

Thus, the interrupted communication can be reopened through the network Ne according to user's convenience, in the embodiment.

When degradation of communication quality is detected during a communication through a network Nf called from the other party in case the first priority set '#1' is pre-set by the user, the network selector 11 selects a network Ng, the PHS for example, having a highest priority representing a cheapest service charge among available networks {Nm} in the same way, through which the calling unit 5 calls the telephone number transmitted through the network Nf and registered in the telephone number resister 4 for reopening the communication through the network Ng.

Thus, also the communication called by the other party can be reopened through the network Ng according to user's convenience of he multi-modal handy phone 10, in the embodiment.

Heretofore, the invention is described in connection with some embodiments, however other various applications of the present invention can be considered in the scope of the invention, by optionally combining certain of these embodiments.

What is claimed is:

1. A radio telephone system having a multi-modal handy phone accessible to a plurality of radio telephone networks, said multi-modal handy phone comprising:

a plurality of radio modules, each of said radio modules adapted to access a corresponding one of the plurality of radio telephone networks;

a communication monitor monitoring communication quality between said multi-modal handy phone and each of the plurality of radio telephone networks, the communication monitor detecting a degradation in communication quality and providing a signal for controlling a changeover to an alternative radio module in the event of a degradation in communication quality;

a changeover unit selecting one of the plurality of radio modules in response to the signal from the communication monitor;

a telephone number register storing a telephone number of the other party with which said multi-modal handy phone is in communication, said telephone number of the other party being transmitted from one of the plurality of radio telephone networks when the multi-modal handy phone is called through said one of the plurality of radio telephone networks;

a calling unit calling a telephone number registered in said telephone number register by way of one of said plurality of radio modules selected by said changeover unit, said calling unit being controlled by said changeover unit to automatically call the telephone number registered in the telephone number register through one of said radio modules when the communication monitor determines that a presently used one of the radio telephone networks has become unavailable; and a user interface unit interfacing signals to be sent and received through said one of said plurality of radio modules selected by said changeover unit with a user.

2. The radio telephone system recited in claim 1, wherein said multi-modal handy phone further comprises a network selector for selecting an available network among the plurality of radio telephone networks according to priority preset by a user.

3. The radio telephone system recited in claim 2, wherein said multi-modal handy phone further comprises a display for displaying selection results of said network selector.

4. The radio telephone system recited in claim 1, wherein said communication monitor monitors said communication quality making use of signal amplitude received from said each of the plurality of radio telephone networks.

5. The radio telephone system recited in claim 1, wherein said communication monitor monitors said communication quality referring to carrier strength of said each of the plurality of radio telephone networks.

6. The radio telephone system recited in claim 1, wherein said communication monitor monitors said communication quality by counting bit errors of signals received from said each of the plurality of radio telephone networks.

7. The radio telephone system recited in claim 1, wherein said communication monitor monitors said communication quality by counting frame errors of signals received from said each of the plurality of radio telephone networks.

8. The radio telephone system recited in claim 1, wherein said communication monitor monitors said communication quality by counting symbol errors of signals received from said each of the plurality of radio telephone networks.

9. The radio telephone system recited in claim 1, wherein said communication monitor detects degradation of said communication quality referring to monitoring results for a certain period of said communication quality.

10. A radio telephone system having a multi-modal handy phone accessible to a plurality of radio telephone networks, said multi-modal handy phone comprising:

a plurality of radio modules, each of said radio modules adapted to access a corresponding one of the plurality of radio telephone networks;

a communication monitor monitoring communication quality between said multi-modal handy phone and each of the plurality of radio telephone networks;

a changeover unit selecting one of the plurality of radio modules according to a result of monitoring of said monitor;

a telephone number register storing a telephone number of the other party with which said multi-modal handy phone is in communication, said telephone number of the other party being transmitted from one of the plurality of radio telephone networks when the multi-modal handy phone is called through said one of the plurality of radio telephone networks;

a calling unit calling a telephone number registered in said telephone number register by way of one of said plurality of radio modules selected by said changeover unit; and a user interface unit interfacing signals to be sent and received through said one of said plurality of radio modules selected by said changeover unit with a user; and further wherein at least one of the plurality of radio telephone networks comprises:

a quality monitor detecting abnormal interruption of each communication performed through said at least one of the plurality of radio telephone networks; and a pre-announce unit pre-announcing reopening of a communication to the other party that has been detected by said quality monitor to be interrupted abnormally between said multi-modal handy phone and said at least one of the plurality of radio telephone networks.

11. A radio telephone system having a multi-modal handy phone accessible to a plurality of radio telephone networks, said multi-modal handy phone comprising:

a plurality of radio modules, each of said radio modules adapted to access a corresponding one of the plurality of radio telephone networks;

a communication monitor monitoring communication quality between said multi-modal handy phone and each of the plurality of radio telephone networks;

a changeover unit selecting one of the plurality of radio modules according to a result of monitoring of said monitor;

a telephone number register storing a telephone number of the other party with which said multi-modal handy phone is in communication, said telephone number of the other party being transmitted from one of the plurality of radio telephone networks when the multi-modal handy phone is called through said one of the plurality of radio telephone networks;

a calling unit calling a telephone number registered in said telephone number register by way of one of said plurality of radio modules selected by said changeover unit, said calling unit being controlled by said changeover unit to automatically call the telephone number registered in the telephone number register through one of said radio modules when the communication monitor determines that a presently used one of the radio telephone networks has become unavailable;

a user interface unit interfacing signals to be sent and received through said one of said plurality of radio modules selected by said changeover unit with a user; and a network selector selecting one of the radio modules for further communication based on user set priority data.

12. The radio telephone system of claim 11, wherein the user set priority data include at least one of:

service charge of each of the radio telephone networks;

extent of the service area of each of the radio telephone networks; and robustness of each radio telephone network with respect to movement of mobile terminals of the radio telephone network.

\* \* \* \* \*